(12) United States Patent
Farrow

(10) Patent No.: US 7,693,481 B2
(45) Date of Patent: Apr. 6, 2010

(54) DEVICE AND METHOD TO STORE PRODUCT INFORMATION

(75) Inventor: Daniel W. Farrow, Noblesville, IN (US)

(73) Assignee: Delphi Technologies, Inc., Troy, MI (US)

(*) Notice: Subject to any disclaimer, the term of this patent is extended or adjusted under 35 U.S.C. 154(b) by 1493 days.

(21) Appl. No.: 11/029,144

(22) Filed: Jan. 4, 2005

(65) Prior Publication Data

US 2006/0148400 A1 Jul. 6, 2006

(51) Int. Cl.
*H04H 1/00* (2006.01)

(52) U.S. Cl. .................. 455/3.02; 455/3.06; 455/414.2; 455/456.3

(58) Field of Classification Search ............ 455/2.01, 455/3.01, 3.02, 3.03, 3.06, 427, 414.1–4, 455/432.3, 12.1, 13.2, 456.1, 456.3, 414.2, 455/414.3, 414.4, 566, 412.1; 726/26
See application file for complete search history.

(56) References Cited

U.S. PATENT DOCUMENTS

2002/0132575 A1* 9/2002 Kesling et al. ............ 455/2.01
2003/0098782 A1* 5/2003 Eastman et al. ............ 340/7.46
2005/0083932 A1* 4/2005 Lee et al. .................... 370/390
2005/0193408 A1* 9/2005 Sull et al. ..................... 725/32
2006/0143677 A1* 6/2006 Weiss ......................... 725/117

FOREIGN PATENT DOCUMENTS

| EP | 1352788 | 10/2003 |
|---|---|---|
| EP | 1632867 | 3/2006 |
| EP | 1632873 | 3/2006 |

OTHER PUBLICATIONS

EP Search Report Dated Oct. 29, 2007.

* cited by examiner

*Primary Examiner*—John Lee
(74) *Attorney, Agent, or Firm*—Jimmy L. Funke

(57) ABSTRACT

A device and a method are provided for receiving items of product information over a satellite digital audio radio (SDAR) network and locally storing the information therein. A mobile device is provided that comprises a control section and mobile information storage in electrical communication with the control section. The control section is adapted to communicate the items of product information received over the SDAR network to said mobile information storage.

17 Claims, 10 Drawing Sheets

DEVICE AND METHOD TO STORE PRODUCT INFORMATION

TECHNICAL FIELD

The present invention generally relates to a system and method for transferring and storing information over a wireless medium and more specifically to a system and method for transferring and storing product information to a mobile environment utilizing satellite technology.

BACKGROUND

In our mobile society, there is a demand for mobile communication that allows a person to roam freely while maintaining the ability to send, receive, and access information from many locations. A wide range of wireless systems are in use today and more are now scheduled for imminent future deployment.

Examples of conventional wireless devices commonly found in vehicles include AM/FM radios, television receivers, satellite digital audio radio service (SDARS) receivers, global positioning system (GPS) devices and other wireless receivers. In today's mobile environment, many consumers rely on these and other modern technologies to efficiently accomplish tasks that once required additional forethought and pre-planning. More specifically, consumers have increasingly relied on satellite technology due to its added advantages.

For example, a service is currently offered (using GPS technology) that presents users with step-by-step directions that guide them along an efficient route to reach a specific destination based on their tracked position, and, services even provide an indication, or warning, when the user strays from their designated course. Other consumers have subscribed to satellite radio (SDARS technology) primarily for a consistently high quality signal that is made available using digital technology. Not only does the digital signal provide a clearer, crisper audio output, it often carries with it information that describes and classifies the contents therein. For example, some receivers display the title, author, and the like of music playing on the receiver.

Satellite radio is additionally preferred in regions where traditional radio transmissions are unavailable due to limitations resulting from the surrounding geographical environment. Satellite radio, as compared to conventional AM/FM radio is provided substantially free from on-air/audio advertisements, i.e. commercials, or the like. Currently, however, satellite radio subscribers must pay a premium to subscribe to, or access, the service.

SUMMARY

A device and a method are provided for receiving items of product information over a satellite digital audio radio (SDAR) network and locally storing the information therein. A mobile device is provided that comprises a control section and mobile information storage in electrical communication with the control section. The control section is adapted to communicate the items of product information received over the SDAR network to said mobile information storage.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

DETAILED DESCRIPTION

The exemplary product review system described herein may be used with various wireless systems, for example, among others, satellite radio systems. In this example, the product review system provides a mobile device that locally stores and presents up-to-date product information to an operator utilizing some of the communication methods that exist in satellite systems. It should be noted that, for purposes of the embodiments disclosed herein, instead of locally storing and presenting only product information to the user, the embodiments disclosed herein may be used to locally store and present any information to the user. Such information is not limited to, but may include items such as the restaurant reviews, movie reviews or the like. For clarity, however, some examples relating to sports and movie reviews are used in connection with the embodiments described below. Such description is not intended to limit the embodiments to only such reviews.

Figure 1:
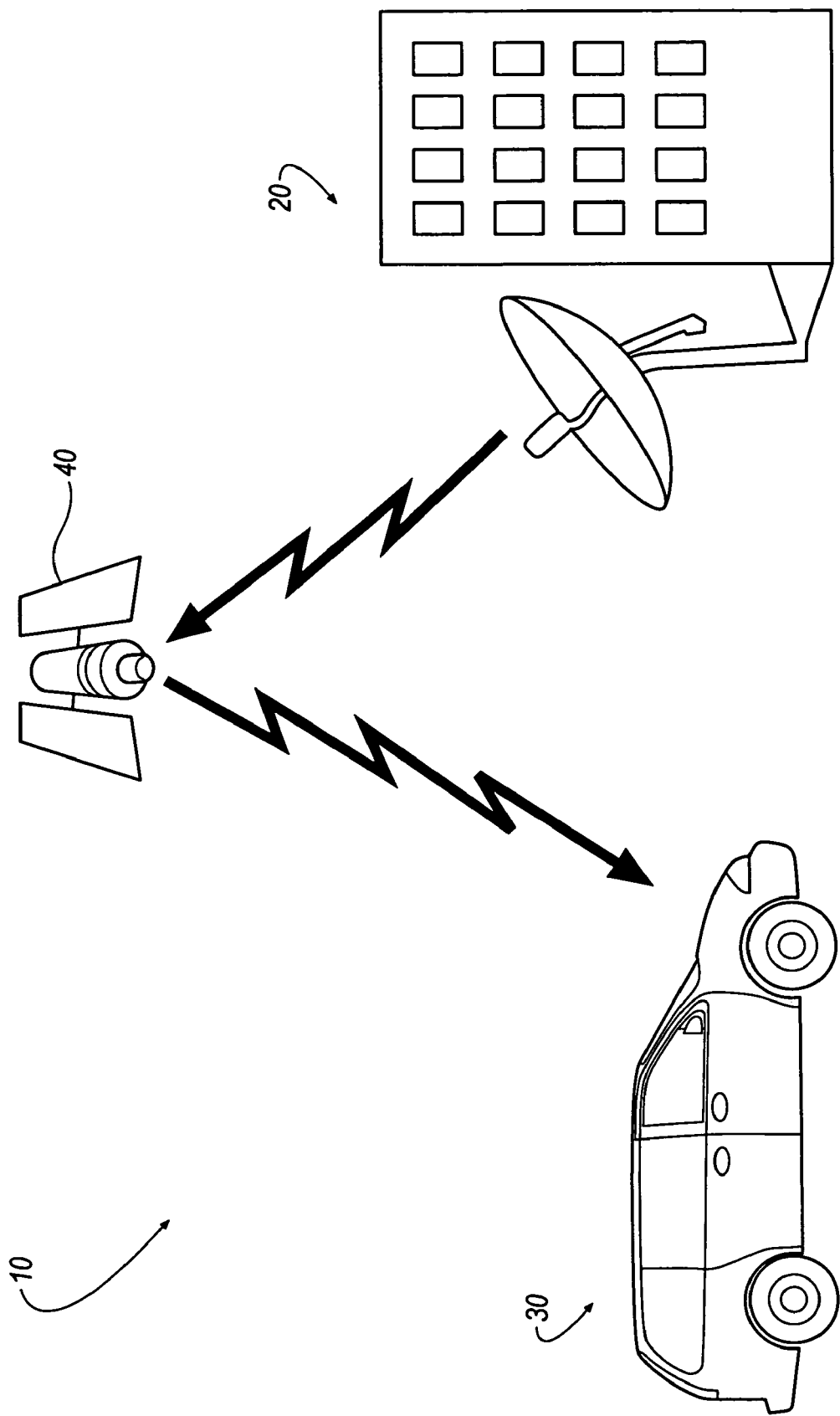
FIG. 1 is a diagrammatic depiction of an embodiment of the present invention.

An embodiment of the product review system 10 of the present invention, as illustrated in FIG. 1, will first be discussed using a satellite as a "bent elbow" to facilitate the transfer of a digital signal. An exemplary application of a movie review system will then be discussed, explaining how information storage systems may be utilized in combination with wireless communication systems, and further how the information storage systems are updated. An exemplary refresh algorithm used by an exemplary product review system will then be described, showing the procedural operation of such a review system.

In the following description, for purposes of explanation, numerous specific details are set forth in order to provide a thorough understanding of the present system and method. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 2:
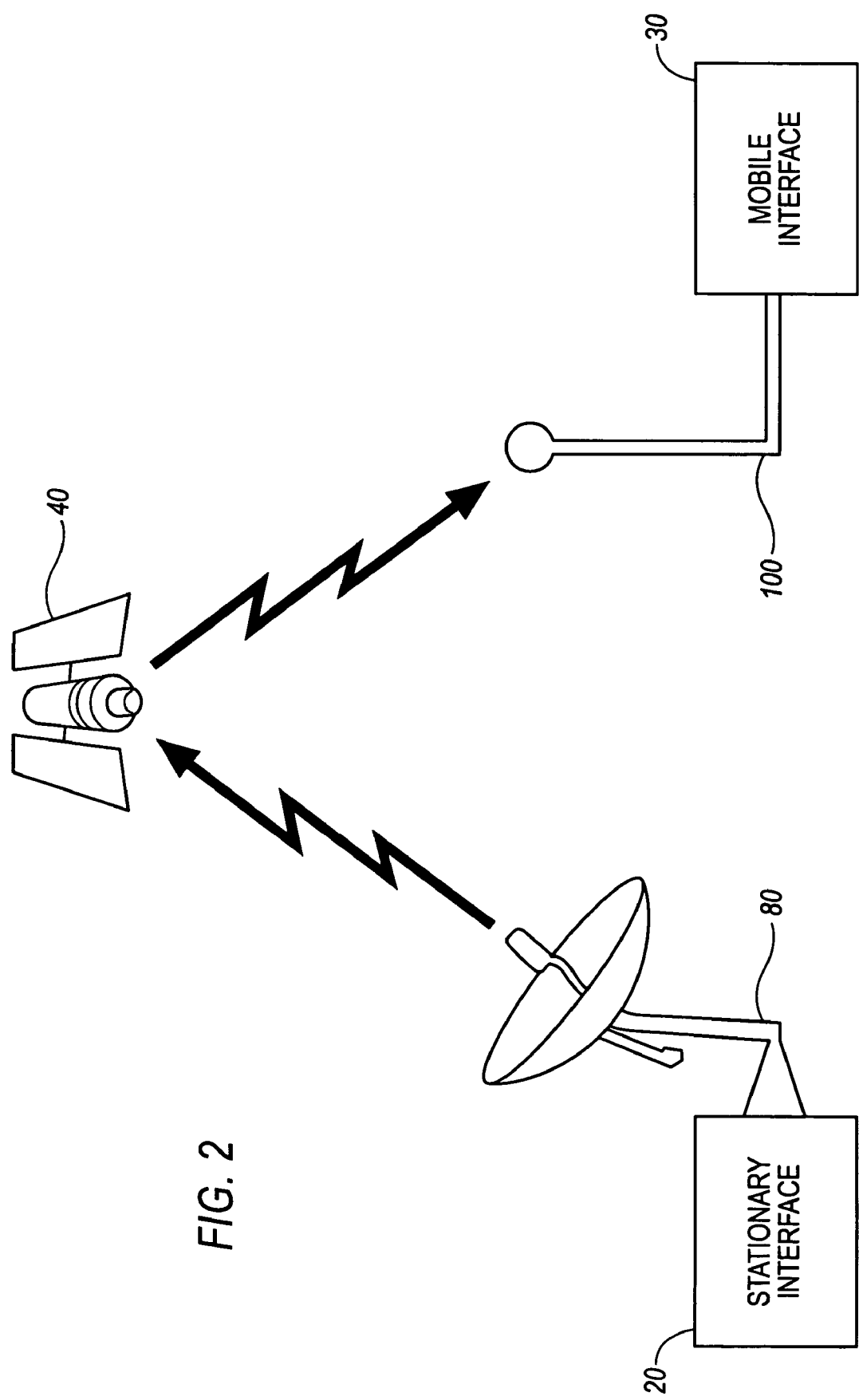
FIG. 2 is another diagrammatic depiction of an embodiment of the present invention.

FIG. 2 depicts a block diagram of a product review system 10 according to an embodiment of the present invention. The illustrated system 10 includes a stationary device 20 and a mobile device 30 that are connected to each other through a communication network 40. Here, the communication network 40 includes a satellite 45 that performs information transmission using a communication protocol such as the one used in satellite communication (for example, SDARS (satellite digital audio radio service) and the like).

Figure 3:
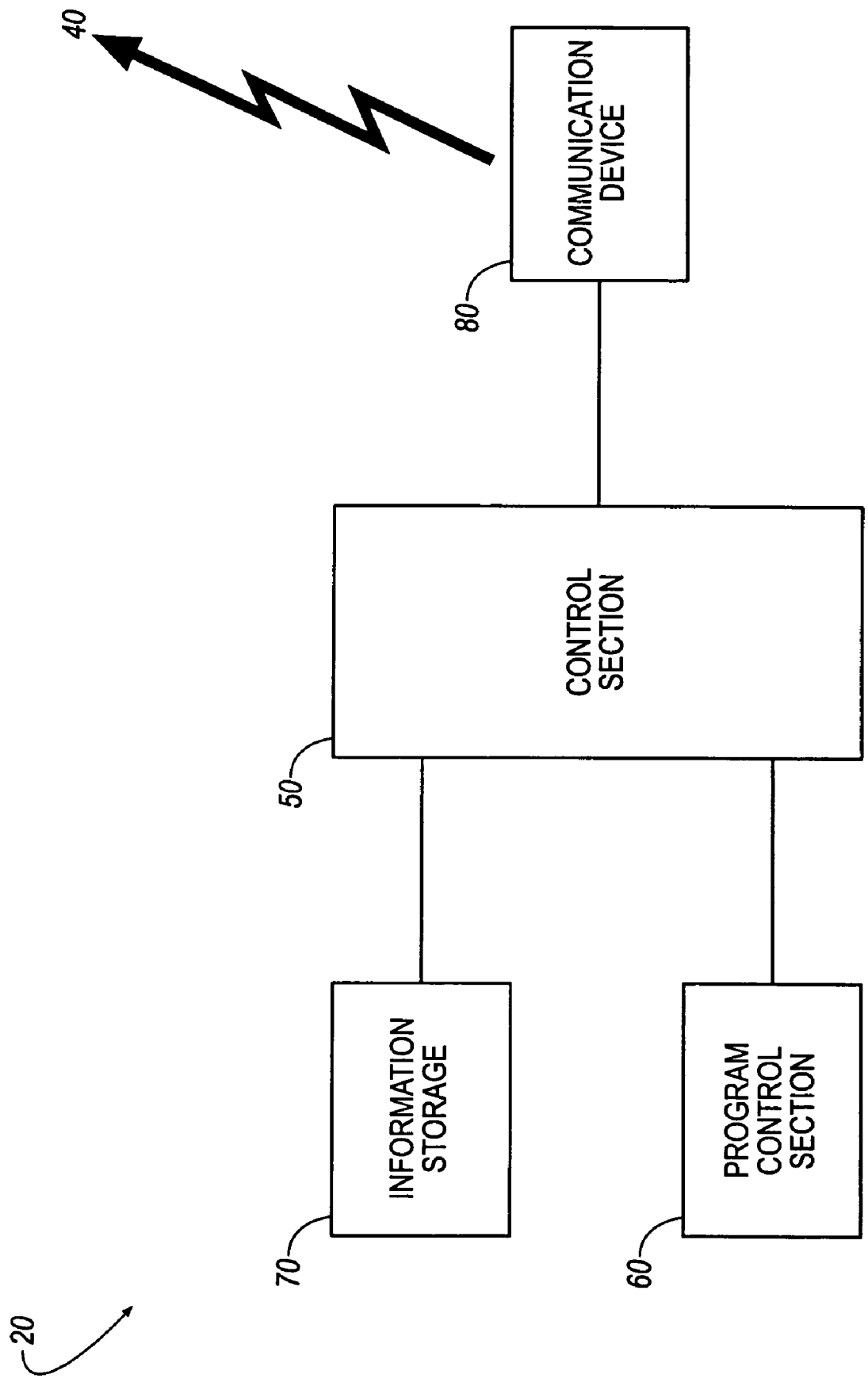
FIG. 3 is a block diagram depicting an embodiment of a stationary device in accordance with the present invention.

FIG. 3 is a block diagram that illustrates a configuration of the stationary device 20. The stationary device 20 includes a control section 50, a program control section 60, an information storage 70, a communication device 80 such as an antenna that connects the stationary device 20 to the communication network 40 to control information communications between the stationary device 20 and the mobile device 30.

The information storage 70 of the stationary device 20 includes a rewritable storage device such as a hard disk device, a flash memory and various kinds of storage media, or a storage medium and stores items of information provided to the mobile device 30 that is updated as required. Similarly, the program control section 60 includes a storage device such as a hard disk, a semiconductor storage device or the like, and stores at least an operation program for the stationary device 20.

The control section 50 of the stationary device 20 includes, for example, a CPU (Central Processing Unit) that controls the stationary device 20 and executes operations or programs included in the program control section 60, such as, transmitting information contained in the information storage 70 to the mobile device 30 using the communications network 40.

Figure 4:
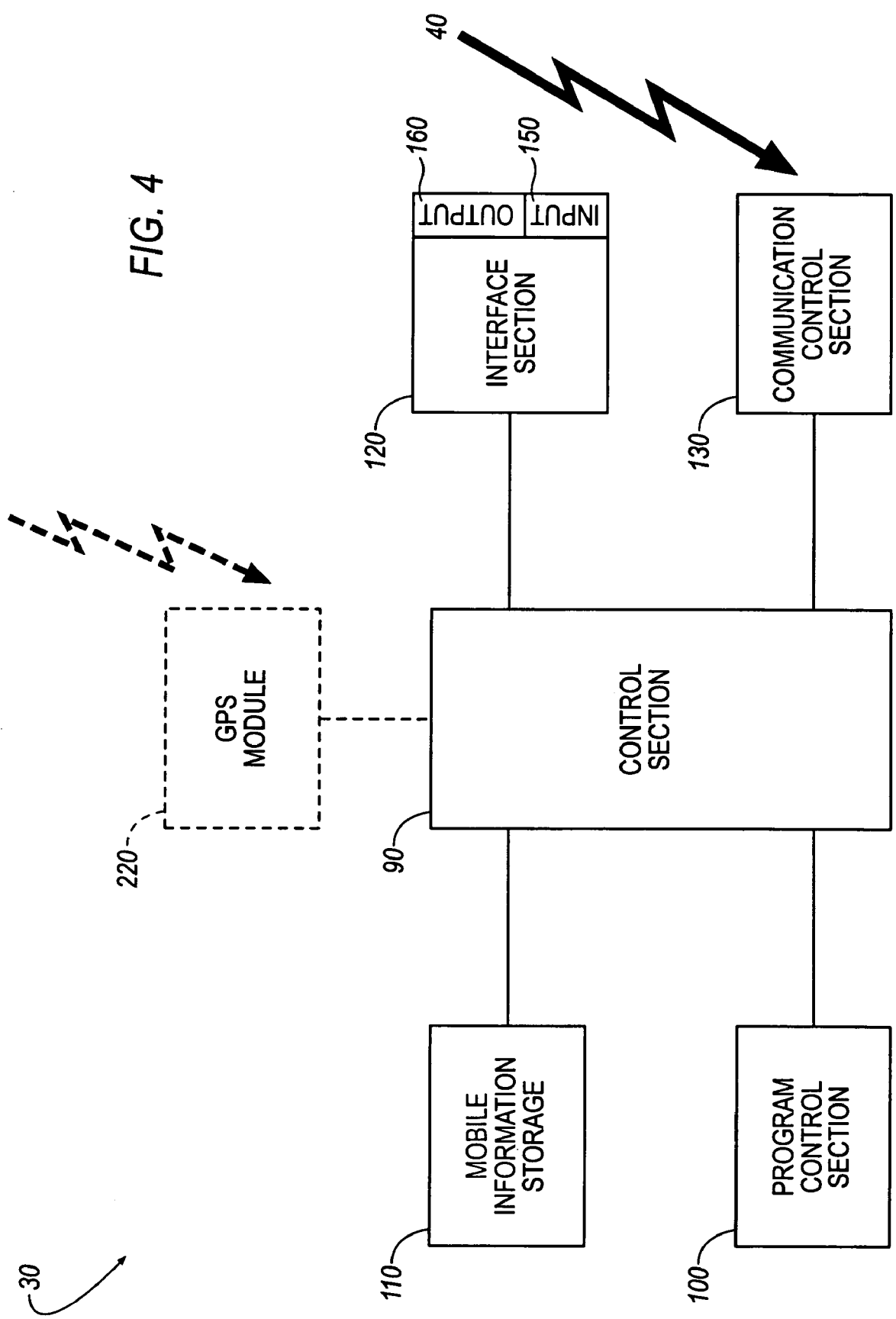
FIG. 4 is a block diagram depicting an embodiment of a mobile device in accordance with the present invention.

FIG. 4 is a block diagram illustrating a configuration of the mobile device 30. Mobile device 30 includes a control section 90, a program control section 100, a mobile information storage 110, an interface section 120, and a communication control section 130.

The control section 90 of the mobile device 30 includes, for example, a CPU (Central Processing Unit) that implements each process to be described later by executing an operation stored in the program control section 100.

The communications control section 130 of the mobile device 30 includes a communications apparatus (including a circuit, module, etc.) having, for example, an antenna, to connect the mobile device 30 to the communication network 40 and perform information communication with the stationary device 20.

Mobile information storage 110 of the mobile device 30 includes a rewritable storage device such as a hard disk device, a flash memory and various kinds of storage media, or a storage medium. The mobile information storage 110 is adapted to retain the product information and reviews transferred to it from the stationary device 20.

The program control section 100 of the mobile device 30 includes a rewritable storage device such as a hard disk device, an EEPROM (Electrically Erasable Programmable Read Only Memory), a flash memory and various kinds of storage media, or a storage medium, and records an operation program (a program for storing and accessing the product information stored on mobile information storage 70 and the like).

Figure 5A:
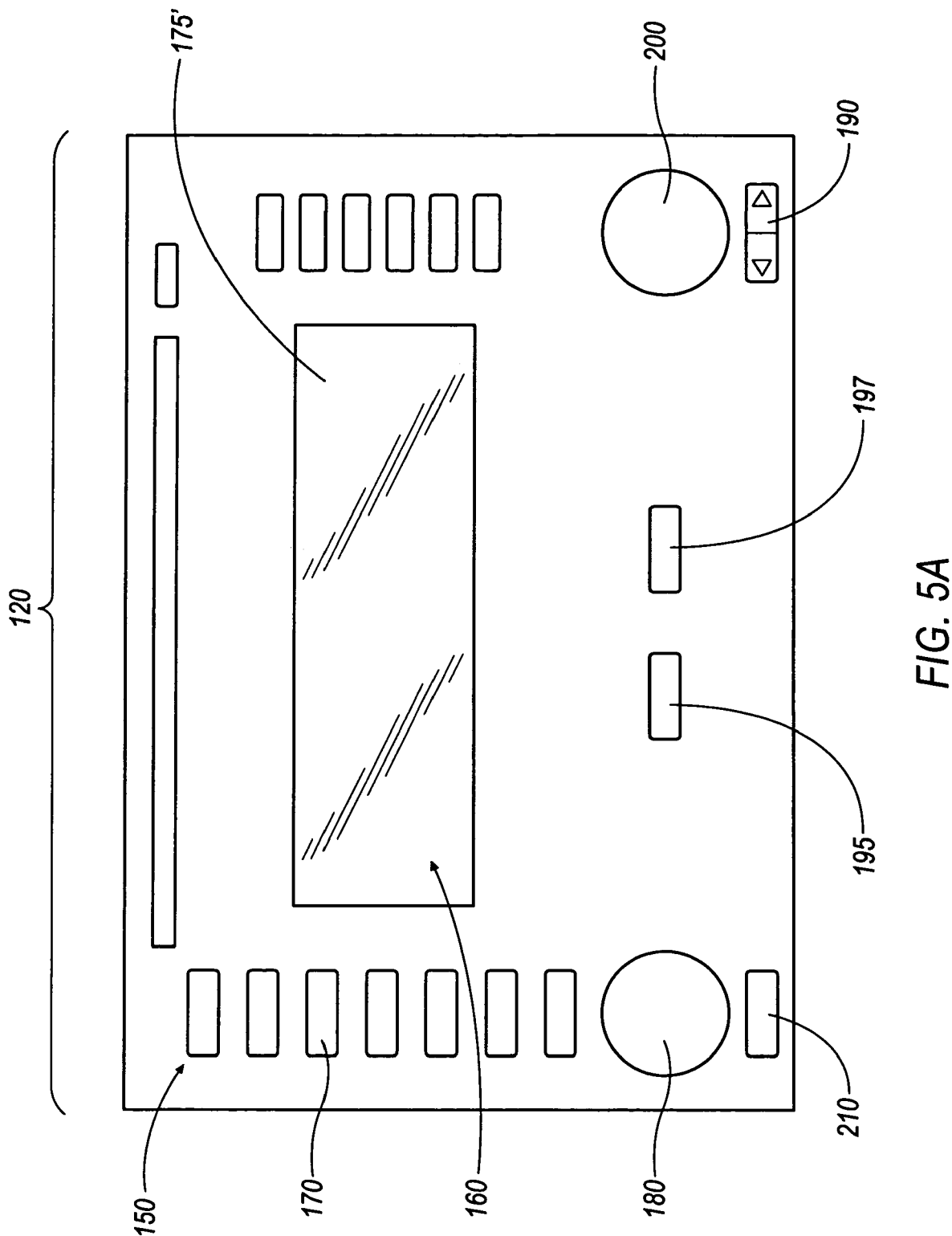
FIG. 5A is a front view of a user interface, according to an embodiment of the present system.
Figure 5B:
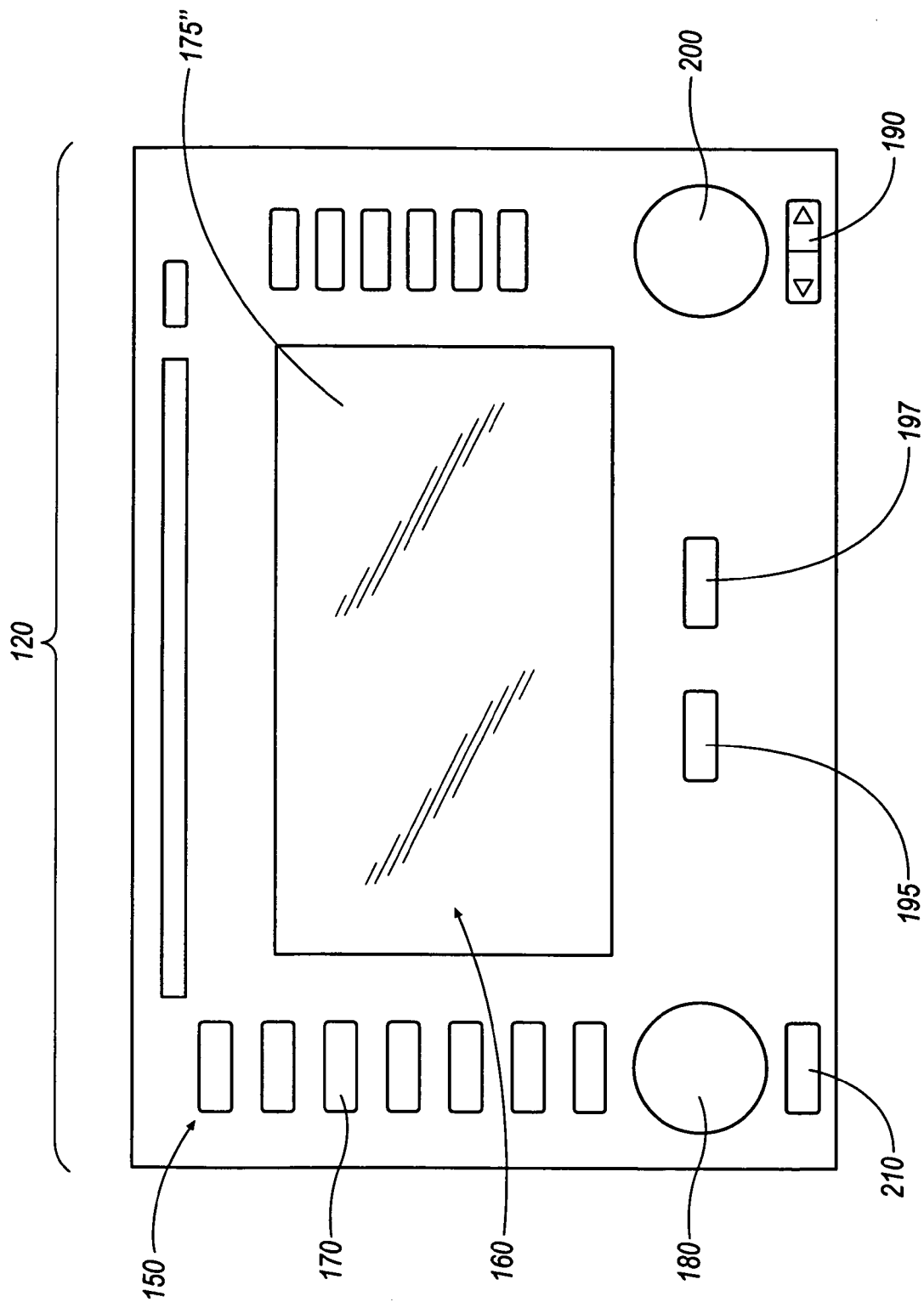
FIG. 5B is a front view of another user interface, according to an embodiment of the present invention.

The interface section 120 of the mobile device 30 includes an input section 150 and an output section 160. With reference to FIGS. 5A and 5B, the interface section 120 may employ conventional radio structure.

With reference to the FIGS. 4, 5A, and 5B, the input section 150 of the interface 120 includes a device selection 170, a channel tuner 180, seek/scan 190, forward and reverse inputs 195, 197, and volume control 200. The output section 160 is at least configured to display information to an operator using a display device 175', 175". Thus, an embodiment of an output section 160 includes a display device 175', 175". In FIG. 5A the display 175' is a digital display. Other mechanisms such as liquid crystal displays (LCD), light emitting diodes (LED), digital displays or the like may be used as an output device in the output section 160. In this embodiment, the product review is textually displayed.

FIG. 5B illustrates another embodiment of the interface section 120 wherein a graphical user interface (GUI) is used as the display device 175", illustrated as a video display device. The video display device is adapted to display, among other things, video-clips, still pictures, alpha-numeric characters, and the like. Thus, for example the video display device may further be connected to a DVD playing device or incorporated as part of a GPS navigation unit.

In the embodiments of FIGS. 5A and 5B, the mobile device 30 further includes an information button 210 to activate the interface section 120 of the mobile device 30. Upon request from, for example, the information button 210, the interface section 120, the communication control section 130, or the program control section 100, the control section 90 executes an operation to access the mobile information storage 110 and thereby display the requested information upon the output section 160 of the interface section 120. Thus, for example, a movie review or clip is displayed upon the video display device 175". The movie or information may be forwarded or reversed using the controls 195, 197 provided on the device. Likewise, in another embodiment, the seek/scan button 190 is employed to toggle through the various movies contained in mobile information storage 110. While buttons are herein described, it is obvious that various alternatives may be employed, such as a dial, a touch screen, or other selection means.

One embodiment of the communication network 40 utilizes s broadcast Satellite Digital Audio Radio Service (hereinafter SDARS), such as, for example, of the type used commercially by XM RADIO™. SDARS operates in the 2.3 GHz S-band or, more specifically, substantially between 2320 to 2345 MHz. In the United States, SDARS communication is currently being utilized for transmitting satellite radio signals and may be utilized by the present invention; however, other satellite communication methods capable of transmitting and/or broadcasting packetized digital data are additionally foreseen and may be substituted therefor.

As in conventional satellite communication systems, at least one terrestrial repeater (not shown) may be used to receive and retransmit the satellite signals to facilitate reliable reception/transmission in geographic areas where reception from satellites is obscured by tall buildings in downtown areas, mountains, tunnels, weather and electrical interference, and other similar obstructions. The communication control section 130 of the mobile device 30 is therefore designed to receive one or both of the signals from the satellite or the terrestrial repeaters and to combine, or to select at least one of, the signals to generate the appropriate receiver output.

In one embodiment, the signals are conventionally packeted, transmitted, and received. Thus, for example, in the XM RADIO™ application, the stationary device 20 and the mobile device 30 include an encoder to perform an analog to digital conversion, or compression. The encoded channels are then combined in a multiplexer using time division multiplexing techniques. Next, the data may be further encoded using Viterbi, Reed-Solomon algorithms, or the like. These common algorithms are currently used to encrypt data in many digital communication systems including automatic teller machines, mobile phones, wireless LANs, xDSL, and many satellite services. The digital stream, next is transmitted to the satellite which modulates the data onto a radio-frequency (RF) carrier using quadrature phase shift keying (QPSK) modulation in the X-Band (7.025-7.075 GHz). The data from the satellites is next broadcast down to the mobile receiver in the S-Band and decoded using signal power estimations, passed through a demodulator, and finally demuxed.

Conventional satellite systems currently employ various methods to decipher, decode and thereby separate, characterize, and categorize the information received at the unit, based on information contained in the header of the signal. In the present invention, the mobile device 30 is configured to first decipher whether the information received by the communication control section 130 contains information or is an audio signal. In accordance with this, an embodiment of the present invention characterizes the signal based on the header information contained therein. Thereupon, if the signal is characterized as an informational signal, the signal is communicated to the control section 90. Based on further information contained within the signal, the control section 90 determines whether to present this information to the interface section 120, or write the information into the mobile information storage 110 or the program control section 100.

The items of information stored at mobile information storage 110 and the program control section 100 may be static or dynamic. That is, in the static environment once the information is communicated to the respective section 100, 110 from the control section 90, it is not removable and may only be read therefrom. (i.e. read only memory (ROM)) On the other hand, in the dynamic environment such information may be updated, by example, upon one of the following: command from the stationary device 20, command from information contained in the received signal, or command from the control section 90. Thus, dynamic information may be changed, or refreshed. As movies, and other products change, the product review system will then update the information to reflect such changes to allow users the most current information.

In one embodiment, the information storage method for writing information into the mobile information storage 110 is an en-masse update. That, is, all or most of the items of information are placed into mobile information storage 110 for a specified or pre-defined period of time, and, subsequently, overwritten by newer information broadcast from the stationary device 30.

In another embodiment, items of the information are written or updated into the mobile information storage 110 using the first-in, first-out memory (FIFO) storage method. That is, the least recent items of information in local information storage 110 are replaced with the more recent items. This storage method, in the context of movie or product reviews, ensures that the older movies, or products, are first written over, or first updated. Each movie or each product are represented as an item. Methods such as this allow the product information to be intermittently updated to avoid some of the conventional problems that arise with large updates, namely long download times. In even another embodiment flags or markers may be attached to the header of the signal to index or identify the item of information, so that the control section 30 may prioritize the replacement of the information, and delete or replace the information with more current information. Mobil information storage 110 is included to at least allow the user to locally retrieve information and avoid a lag period or downtime that often results from accessing information over a wireless communication network 40.

In an embodiment of the present invention, the stationary device 20 is further adapted to deliver, among other possibilities, promotional materials, various types of product information, entertainment information, or the like to the communication control section 130 of mobile device 30. The category, type, style, and substance of transmitted information may be standardized among every operator connected to the communication network 40 and the stationary device 20. However, each item of information may, instead, be targeted to specific mobile devices 30 by applying various filters. For example, a geographic filter may be provided that is designed to narrow the information stored in or presented at the mobile device 20 within a designated area. Other filters based on other known data may be additionally provided. Some of these filters will be described in detail below.

In another embodiment, a mobile device 30 is targeted with particularized information. This targeted mobile device 30 is chosen according to the particularized interests of the user. These particularized interests may be dynamically determined according to algorithms known to the system 10 herein described, or alternatively, those known generally in the art.

Figure 6:
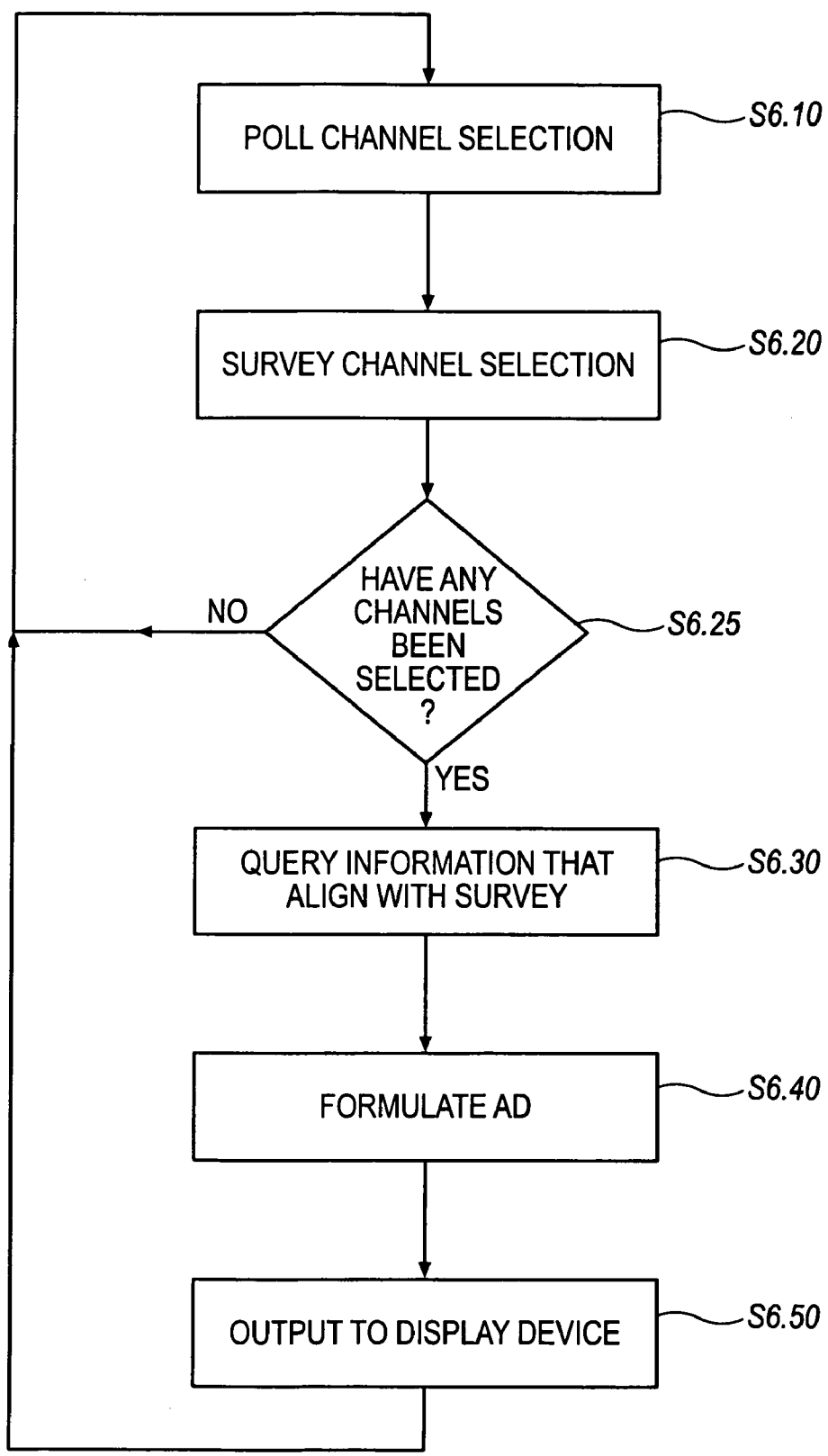
FIG. 6 is a flowchart that illustrates a first method in accordance with an embodiment of the present invention.

With reference to FIG. 6, a method that is implemented either by the stationary device 20 or the mobile device 30 is disclosed. Either device 20, 30 is adapted to substantially continuously poll the mobile device 30 to determine which channels or information are or have been accessed by the operator in step S6.10. Next, the control section 90 updates to reflect which channels that the operator previously indexed or has accessed in step S6.20. For example, where the device is employed in satellite radios, the type of transmissions frequently accessed, i.e. genre/artist, generally presents an indication of operator interest. If a channel selection has been made in step S6.25, market data and consumer trends are then used to generate a directed search among the information in the mobile information storage 110 or the information storage 70 of the stationary device 20 in accordance with the particular accessed channels or access items of information in step S6.30. An ad is formulated in step S6.40, wherein the ad is either broadcast by the communication device 80 of the stationary device 20 to the appropriate mobile device 30 or indexed by the control section 50 of the mobile device 30. The control section 90 then passes the item of information to the output section 160 where it is output in step S6.50 for display on a display device 175', 175". Thus, for illustrative purposes, if a listener spends a majority of his time listening to sports events, either device 20, 30 may highlight such and particularize or filter the information and target such to that specific mobile device 20,30. It should be noted that either device 20, 30 may search for promotional items within the information storage 70, 110 that align with this potential interest, for example, sports paraphernalia.

In an embodiment, the stationary device 20 or the mobile device 30 may index and store subscriber specific identification with particularized data accorded to such. Another embodiment, defines a subset of user preference profiles among each device or indexes sub-subscriber specific identification since the device will often be under the direction of a variety of operators each having unique interests. For example, each operator may have their own unique identification code provided to them by the particular device which is later indexed in the system.

Figure 7A:
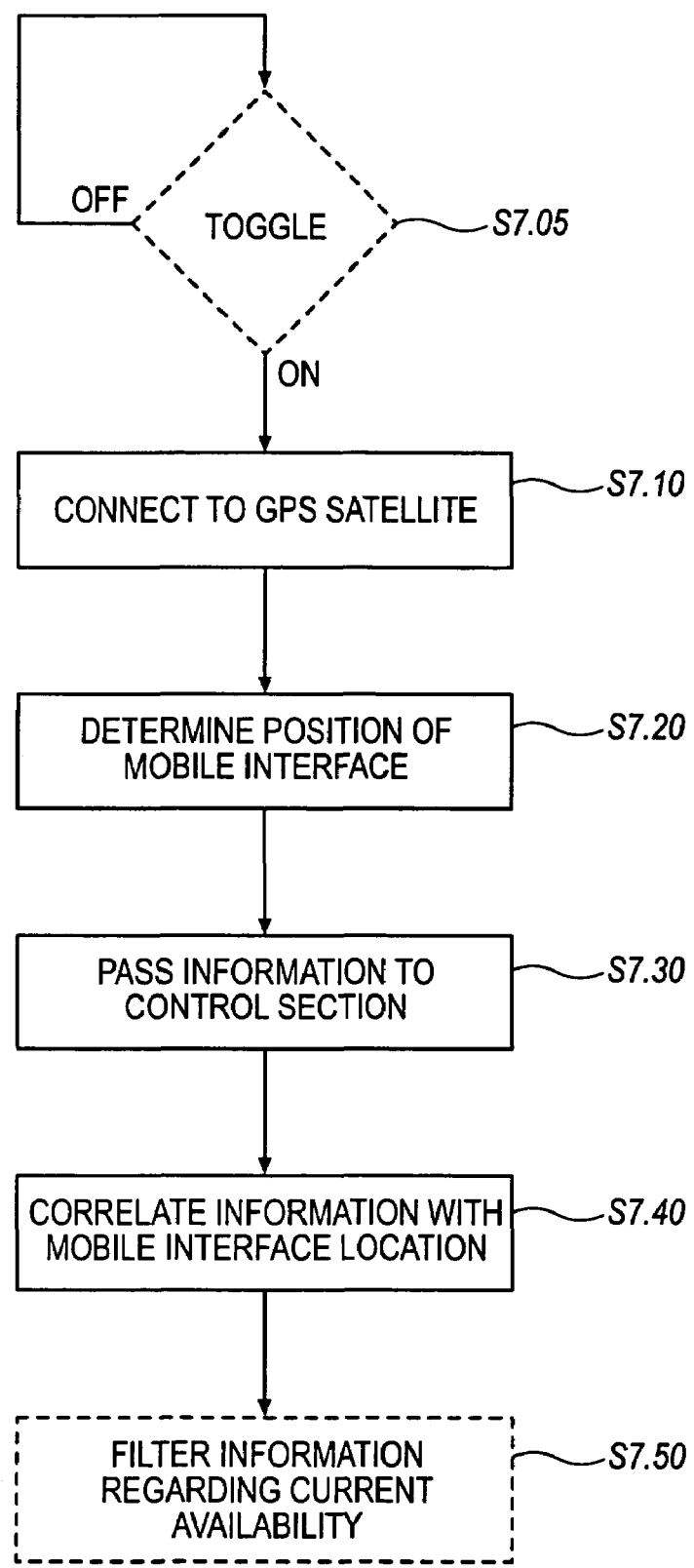
FIG. 7A is a flowchart that illustrates a second method in accordance with an embodiment of the present invention.
Figure 7B:
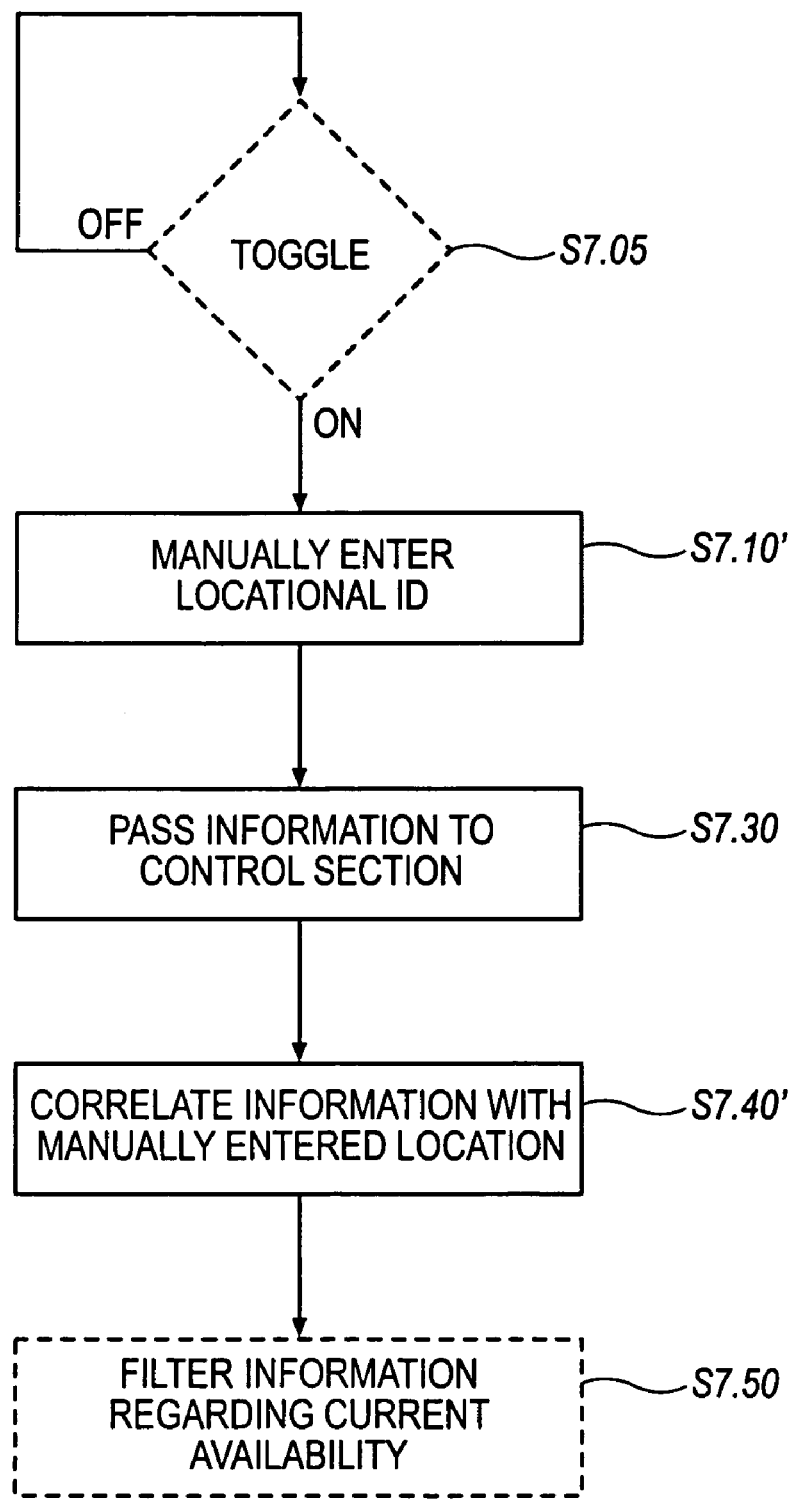
FIG. 7B is a flowchart that illustrates a third method in accordance with an embodiment of the present invention.

With reference to FIG. 4 and FIG. 7A, another method practiced in an embodiment of the present invention is illustrated and described. In an embodiment, the product review system 10 filters the information before presenting such to the interface section 120 of the mobile device 30 according to the location, or position of the mobile device 30. In this embodiment, the mobile device 30 further includes, or is adapted to communicate with a GPS module 220. GPS module 220 is designed to engage or connect to a GPS satellite in step S7.10 as illustrated in phantom in FIG. 3. The GPS module 220 processes data transmitted to it from the GPS satellite to substantially determine the current position and heading of the mobile device 30 in terms of latitude and longitude in step 7.20, wherein latitude is positive north of the equator and longitude is positive east. The GPS module 220 also determines the current heading in terms of azimuth, with the positive direction being clockwise relative to zero degrees north. Once the GPS information has been processed to determine the current position and heading of the vehicle, this information is then passed in step S7.30 to the control section 90. However, in an embodiment, this feature may be switched on or off to avoid privacy and security concerns due to geographical positioning systems (shown in phantom at step S7.05). In another embodiment, the operator may manually provide the locational data. Such a process is illustrated in FIG. 7B. In this embodiment position of the mobile device 30 is determined using a location identification input feature in step S7.20'. While various ways exist to accomplish this, one method of the current invention manually indexes the location using a zip code or area code provided from the operator.

Once a location of mobile device 30 is either identified or provided, the control section 90 correlates the location of the mobile device 30 with the items of information contained in information storage in step S8.40. In this embodiment, the information may be tailored to only display items or locations within a certain distance from the mobile device 30. Thus, for example, movie theatres within a certain vicinity or region surrounding the mobile device 30 will be presented to the interface section 120.

In yet another embodiment, as referenced in phantom in FIGS. 4, 7A, and 7B the control section 90 of the mobile device 30 may further utilize a temporal filter to determine which products or items to promote in terms of their current availability in step S7.50. For example, in one embodiment, the mobile device 30 may indicate which movie theatres are presently open, which movies are presently playing, and, even, their distance, or the estimated time of arrival to such. Thus, in this form, the device omits the movie theatres that are presently closed and/or outside the location.

Figure 8:
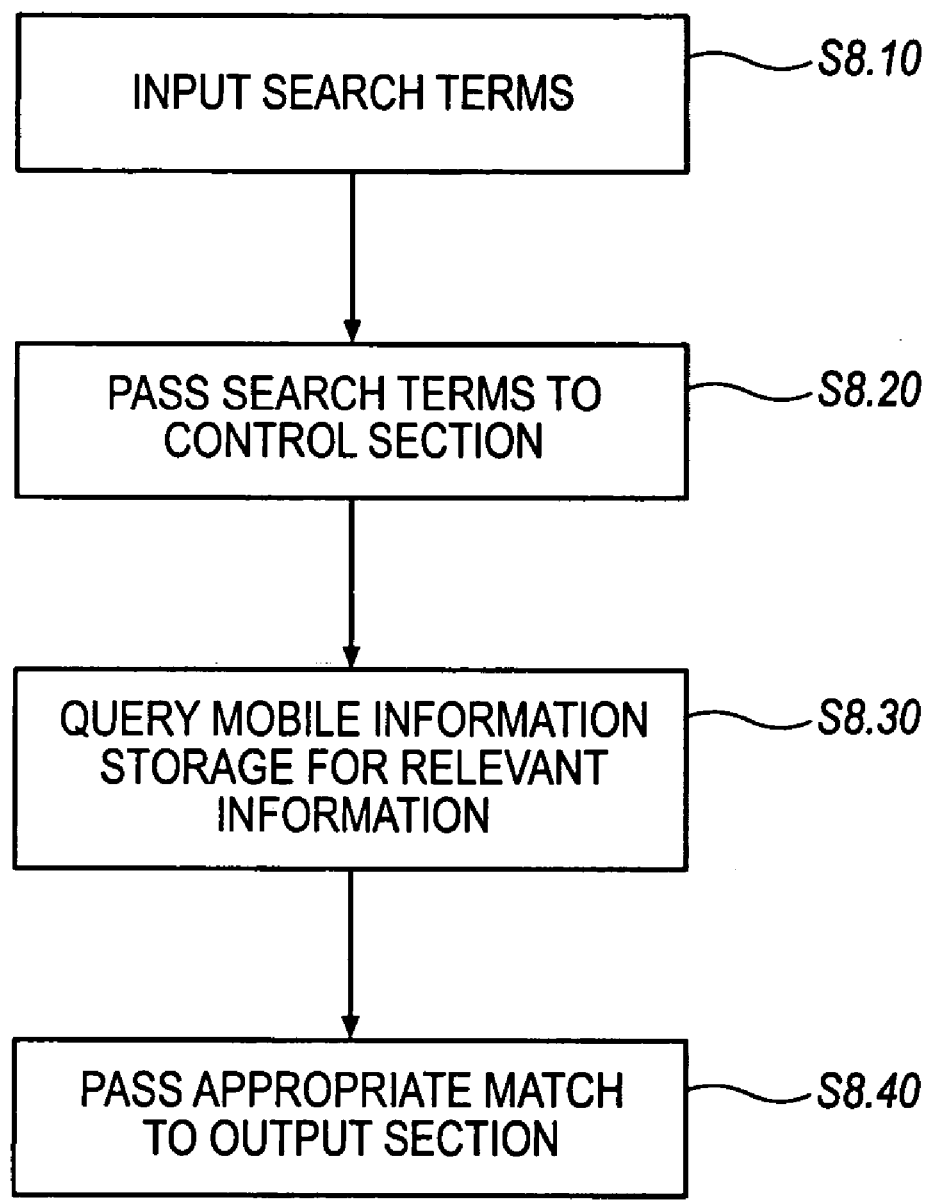
FIG. 8 is a flowchart that illustrates a fourth method in accordance with an embodiment of the present invention.

In even another embodiment, with reference to FIGS. 4 and 8, the input section 160 of the interface section 120 of the mobile device 30 provides an input prompt to allow the operator to customize a search upon the items of information stored in the mobile information storage 110. In this embodiment, for illustrative purposes, the user inputs a search query in step S8.10. The input methods to accomplish this step are generally known in the art. (i.e. smart keys, pre-defined search terms, keyboard or the like.) As the input is collected the input section 160 then passes the inputted terms in step S8.20 to the control section 90. The control section 90 next implements a search by querying the mobile information storage 110 for relevant items of information pertaining to the entered search terms in step S8.30. Thereupon, the control section 90 returns an appropriate match in step S8.40 to the output section 160, specifically the display device 175', 175". For example, a user who inputs a particular movie into the search query will receive a list of local movie theatres. The device, then, upon additional focused inquiries by the operator or automatically, provides movie times, availability, and movie theatre locations within a predefined area. Moreover, if the display device is a video display device the mobile device 30 is adapted to optionally provide at least a preview of the defined movie.

While the foregoing has described what are considered to be preferred embodiments of the present invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A mobile device for receiving promotional items of product information over a satellite digital audio radio (SDAR) network comprising:
   a control section;
   mobile information storage in electrical communication with said control section, wherein said control section is adapted to store said promotional items of product information received over the SDAR network in said mobile information storage, retrieve said promotional items of product information from said mobile information storage, and display said promotional items of product information; and
   a module adapted to determine the approximate location of said mobile device, said module connected to said control section, wherein said item of product information is compared to said approximate location and localized by said control section.

2. The mobile device as described in claim 1 wherein said control section includes at least one profile to reference at least one operator, said control section adapted to particularize said items of product information in accordance with said at least one profile.

3. The mobile device as claimed in claim 1 wherein said control section is adapted to particularize said at items of product information according to current availability.

4. The mobile device as described in claim 1 wherein said mobile device further includes an interface having an input section and an output section connected to said control section.

5. The mobile device as described in claim 4 wherein said output section includes a display device adapted to display said items of product information thereon.

6. The mobile device as described in claim 4 wherein said input section is adapted to receive a search query, and wherein said control section queries said mobile information storage to particularize the items of product information in accordance with the search query.

7. The mobile device as described in claim 1 wherein said control section is further adapted to determine an approximate distance from said items of said product information.

8. The mobile device as described in claim 7 wherein said mobile device further comprises:
   an interface having an output section and an input section connected to said control section wherein said output section is adapted to present directions to at least one of said items in said product information.

9. A method for receiving promotional product information in a satellite digital audio radio (SDAR) network, said method comprising the steps of:
   providing a mobile device having a control section and a local information storage;
   connecting said mobile device to the SDAR network;
   receiving at least one promotional item of product information at said mobile device;
   executing an operation in said control section to store said at least one promotional item of product information in said local information storage, retrieve said promotional item of product information from said local information storage and display said promotional items of product information;

indexing said at least one item of said product information with location identifiers;

providing a module connected to said control section adapted to determine the approximate location of said mobile device; and communicating said location and said location identifiers to said control section.

10. The method for receiving product information as descried in claim 9, wherein said information is stored and refreshed using the first-in, first-out storage method.

11. The method for receiving product information as described in claim 9, further comprising the step of:

updating said product information.

12. The method for receiving product information as described in claim 9 further comprising the step of:

providing an interface connected to said control section, the interfacing having an input section and an output section, the output section having a display to present a least said items of said product information.

13. The method for receiving product information as described in claim 12, further comprising the steps of:

providing an input device connected to said input section of said interface;

providing a tool to allow an operator to input search terms;

communicating said input search terms into said control section;

querying said at least one item of said product information in said location information storage with said search terms to retrieve queried product information; and communicating said queried product information to said display of said output section.

14. The method as described in claim 9, further comprising the step of:

filtering said at least one item of said product information to geographically localize said items within a pre-defined area.

15. The method as described in claim 9 further comprising the step of:

determining a distance between at least one of said indexed items and said mobile device.

16. The method as described in claim 9, further comprising the step of:

determining directions to at least one of said at least one items of said product information from said mobile device.

17. The method as described in claim 9, said method further comprising the step of filtering said at least one item of said product information to narrow the product information based on current availability.

* * * * *